United States Patent
Sukhman et al.

(10) Patent No.: US 9,263,844 B2
(45) Date of Patent: Feb. 16, 2016

(54) AIR-COOLED GAS LASERS AND ASSOCIATED SYSTEMS AND METHODS

(71) Applicant: Universal Laser Systems, Inc., Scottsdale, AZ (US)

(72) Inventors: Yefim P. Sukhman, Scottsdale, AZ (US); Stefano J. Noto, Mesa, AZ (US); Christian J. Risser, Scottsdale, AZ (US); Mikhail E. Ryskin, Phoenix, AZ (US); Jonathan S. Marx, Scottsdale, AZ (US); Robert A. Hoeffer, III, Mesa, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 0 days.

(21) Appl. No.: 14/614,354

(22) Filed: Feb. 4, 2015

(65) Prior Publication Data

US 2015/0244139 A1    Aug. 27, 2015

Related U.S. Application Data

(60) Provisional application No. 61/944,010, filed on Feb. 24, 2014, provisional application No. 61/944,007, filed on Feb. 24, 2014, provisional application No. 61/943,995, filed on Feb. 24, 2014.

(51) Int. Cl.
| | |
|---|---|
| *H01S 3/038* | (2006.01) |
| *H01S 3/03* | (2006.01) |
| *H01S 3/041* | (2006.01) |
| *H01S 3/04* | (2006.01) |
| *H01S 3/0971* | (2006.01) |
| *H01S 3/223* | (2006.01) |
| *H01S 3/034* | (2006.01) |

(52) U.S. Cl.
CPC . *H01S 3/038* (2013.01); *H01S 3/03* (2013.01); *H01S 3/041* (2013.01); *H01S 3/034* (2013.01); *H01S 3/0404* (2013.01); *H01S 3/0971* (2013.01); *H01S 3/2232* (2013.01)

(58) Field of Classification Search
CPC ..... H01S 3/0404; H01S 3/041; H01S 3/0405; H01S 3/03; H01S 3/2232
See application file for complete search history.

(56) References Cited

U.S. PATENT DOCUMENTS

| | | | | |
|---|---|---|---|---|
| 3,683,297 | A * | 8/1972 | Hobart et al. | 372/93 |
| 4,750,186 | A | 6/1988 | Steffen et al. | |
| 4,769,824 | A | 9/1988 | Seki et al. | |
| 5,881,087 | A * | 3/1999 | Sukhman et al. | 372/61 |
| 6,195,379 | B1 | 2/2001 | Jones et al. | |
| 6,198,758 | B1 | 3/2001 | Broderick et al. | |
| 6,983,001 | B2 | 1/2006 | Sukhman et al. | |
| 2002/0018505 | A1 * | 2/2002 | Basting et al. | 372/55 |
| 2005/0175054 | A1 * | 8/2005 | Shackleton et al. | 372/55 |

(Continued)

*Primary Examiner* — Xinning Niu
(74) *Attorney, Agent, or Firm* — Perkins Coie LLP

(57) ABSTRACT

Embodiments of an air-cooled gas laser are disclosed herein. A laser configured in accordance with one embodiment includes a laser superstructure, an optical assembly, and an elongated thermal decoupler member having a first end portion fixedly coupled to the optical assembly and a second end portion fixedly coupled to the laser superstructure. The laser further includes an optical assembly that includes a first holder member fixedly coupled to the first end portion of the thermal decoupler, a second holder member pivotally coupled to the first holder member and fixedly coupled to the laser superstructure, and a flexible seal having a portion coupled to the laser structure and disposed at least between the first holder member and the second holder member.

20 Claims, 10 Drawing Sheets

(56) References Cited

U.S. PATENT DOCUMENTS

| | | |
|---|---|---|
| 2006/0274811 A1 | 12/2006 | Tanaka et al. |
| 2007/0091968 A1 | 4/2007 | Wakabayashi et al. |
| 2009/0304033 A1 | 12/2009 | Ogilvy et al. |
| 2013/0208744 A1 | 8/2013 | Kumazaki et al. |

\* cited by examiner

AIR-COOLED GAS LASERS AND ASSOCIATED SYSTEMS AND METHODS

CROSS-REFERENCE TO RELATED APPLICATION

The present application claims priority to U.S. Provisional Application Nos. 61/944,010, filed Feb. 24, 2014; 61/944,007, filed Feb. 24, 2014; and 61/943,995, filed Feb. 24, 2014, all which are incorporated herein by reference in their entireties.

TECHNICAL FIELD

The present disclosure is directed generally to gas lasers and, more specifically, to air-cooled gas lasers, including high power air-cooled lasers.

BACKGROUND

Carbon dioxide ("$CO_2$") lasers have a variety of industrial uses, including material processing. For example, a $CO_2$ laser can cut shapes or profiles out of materials, remove or modify surface layers of materials, and weld or sinter materials. A $CO_2$ laser typically has a sealed resonator structure containing a laser cavity filled with a process gas. The laser cavity houses electrodes configured to couple electromagnetic energy into the process gas to excite a plasma. In general, the output power level of a $CO_2$ laser is inversely proportional to the process gas plasma temperature; as the process gas temperature increases, the laser output declines proportionately. Thus, an effective solution for heat removal from the laser superstructure is paramount to achieving optimum laser power output. $CO_2$ lasers typically operate at efficiencies of less than 15%, making thermal management one of the key design challenges for effective $CO_2$ laser operation.

In some $CO_2$ laser designs, liquid cooling schemes are employed to remove heat from the laser cavity. In a liquid cooling scheme, a heat exchanger (e.g., a refrigerated chiller) removes heat by pumping a liquid coolant through the electrodes and/or the laser superstructure. One disadvantage of liquid cooling is that it increases the complexity of a laser and the cost of ownership. Other $CO_2$ lasers employ an air cooling scheme. In an air cooling scheme, heat from the plasma is transferred into the electrodes. The electrodes transfer heat into the outer walls of the laser superstructure, where a high-surface-area structure with forced air flow removes the heat from the resonator structure. Although air cooling is less complicated than liquid cooling, it is not as efficient. Thus, air-cooled $CO_2$ lasers typically have a greater power output sag as their temperature tends to increase more during operation than their water-cooled counterparts. Due to these limitations, at this time the maximum output power produced by air-cooled $CO_2$ lasers does not exceed 100 W.

DETAILED DESCRIPTION

Figure 1A:
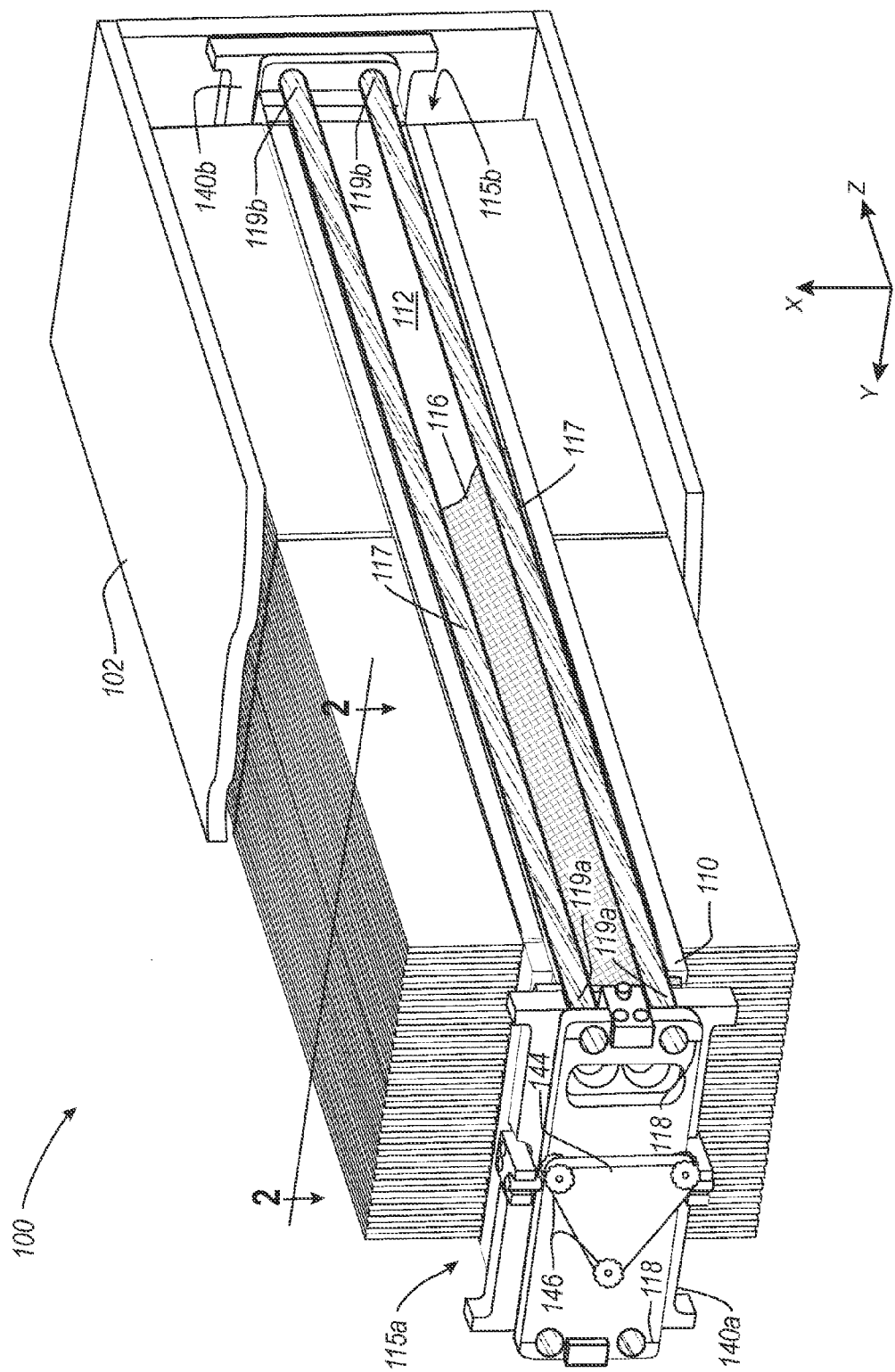
FIG. 1A is an isometric view and FIG. 1B is an enlarged, partially-exploded isometric view of a gas laser configured in accordance with an embodiment of the present technology.

The following disclosure describes various types of gas lasers and associated systems and methods for improving various aspects of their performance. For example, in at least some embodiments, an air-cooled gas laser can include structures and features that reduce operating temperatures and improve output power. As discussed above, traditional air-cooled gas lasers typically have greater power output sag than liquid-cooled gas lasers because air-cooled lasers are less effective at removing heat and tend to operate at higher gas plasma temperatures. Another challenge with air-cooled lasers is that their higher operating temperatures cause thermal expansion during laser operation. Thermal expansion can impact a gas laser's performance in several ways. For example, expansion of the laser superstructure can alter the laser's output wavelength and lower output power and affect mode shape by increasing the separation distance between the laser's resonator optics. Asymmetric thermal expansion of the resonator structure can further reduce the laser output power and mode shape by causing the laser superstructure to bend or twist. Such expansion generally occurs because of structural and thermal asymmetries in the resonator structure.

In at least some gas lasers, components within the resonator structure (e.g., the electrodes and the resonator optics) can thermally expand. Expansion in the resonator optics can cause misalignment of the laser resonator which can result in lowered power output and mode shape. In at least some instances, thermal expansion can be exacerbated when the resonator optics absorb non-reflected beam energy. For at least these reasons, there is a need for technology that reduces the effects of thermal expansion in gas lasers. There is also a need for technology that improves heat transfer in gas lasers to achieve higher operating powers without debilitating levels of output power sag during operation.

Systems, devices, and methods configured in accordance with embodiments of the present technology can at least partially address one or more of the problems described above and/or other problems associated with conventional technologies whether or not stated herein. For example, a gas laser configured in accordance with at least some embodiments of the present technology can include a thermally decoupled laser superstructure. Such a decoupling allows the laser superstructure to thermally expand/contract without substantially impacting the separation distance between the laser's resonator optics. In another embodiment, a gas laser configured in accordance with the present technology includes an optical assembly with the ability to pivot and thereby compensate for any bending of the laser superstructure caused by thermal expansion. In additional or alternate embodiments, a gas laser can include an electrode assembly having an electrode biasedly coupled to a frame to improve heat transfer into the laser superstructure. In still further embodiments, a gas laser can include a resonator optics assembly configured to remove heat from an optical element, such as heat associated with non-reflected laser beam energy.

Certain details are set forth in the following description and FIGS. 1A-6B to provide a thorough understanding of various embodiments of the disclosure. Other details describing well-known structures and systems often associated with $CO_2$ lasers, however, are not set forth below to avoid unnecessarily obscuring the description of the various embodiments of the disclosure. Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1A.

Laser Overview

Figure 1B:
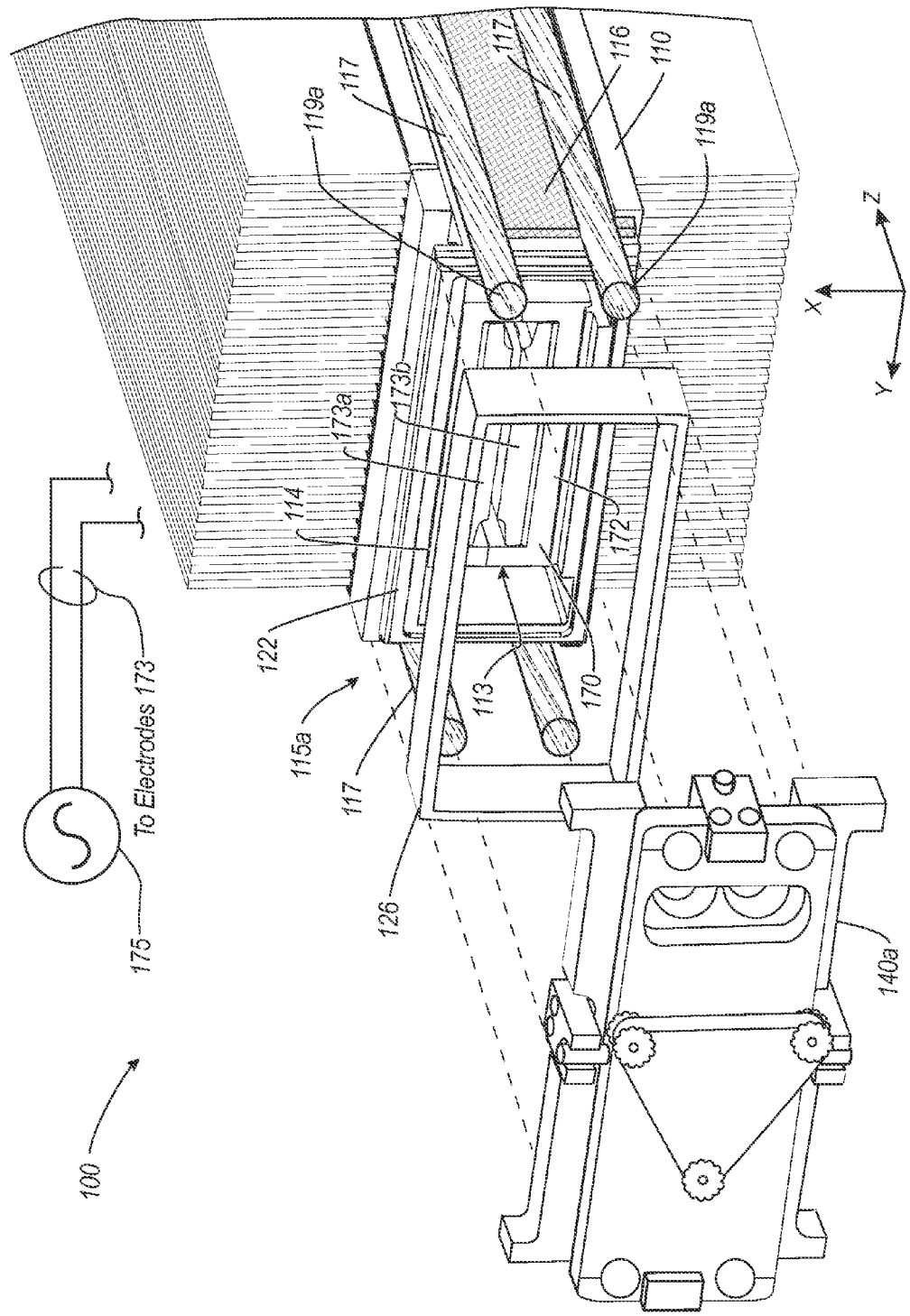

FIG. 1A is an isometric view and FIG. 1B is an enlarged, partially-exploded isometric view of a gas laser ("laser 100"), such as a $CO_2$ laser, configured in accordance with an embodiment of the present technology. Although not shown for purposes of clarity, the laser 100 can include other structures and features not shown in the illustrated embodiment, such as a gas source (e.g., a $CO_2$ gas source), a controller, an internal fan, etc. Referring to FIGS. 1A and 1B together, the laser 100 includes a laser superstructure 110 at least partially contained within a housing 102. The laser superstructure 110 has a cavity 113 (FIG. 1B) extending from a first side 115a to a second side 115b along the long axis of the laser superstructure 110. A first optical assembly 140a is disposed at the first side 115a and faces a second optical assembly 140b (collectively "optical assemblies 140") disposed at the second side 115b. The first optical assembly 140a can include an optical adjustment structure 144 operably coupled to a resonator optics assembly (not visible in FIG. 1A) at an opposite side of the first optical assembly. The optical adjustment structure 144 can include, for example, adjustment features 146 (e.g., adjustment knobs, dials, screws, etc.) for fine-tune adjustment of the laser's resonator optics. In at least some embodiments, the second optical assembly 140b can include optical components similar in structure and/or function to the first optical assembly 140a.

In the illustrated embodiment, the laser 100 includes a one or more elongated thermal decoupler members 117 (e.g., elongated rods) at opposite sides of the laser superstructure 110 and extending along its long axis. Each of the decoupler members 117 includes a first end portion 119a and a second end portion 119b fixedly coupled to the first optical assembly 140a and the second optical assembly 140b, respectively. In the illustrated embodiment, the decoupler members 117 are coupled to either of the optical assemblies 140 using integral shaft collars 118, although in other embodiments other attachment techniques can be used (e.g., welding or via fasteners). As best seen in FIG. 1B, the decoupler members 117 are in parallel with one another and arranged in two pairs at opposite side sides of the laser superstructure 110. In alternate embodiments, the decoupler members 117 can be arranged differently (e.g., at the top and bottom sides of the laser 100). The laser 100 can also include a different number of decoupler members than shown in the illustrated embodiments (e.g., one decoupler member at each side of the laser 100). Further, the decoupler members can have different sizes and/or shapes than shown in the illustrated embodiments, including non-cylindrical shapes (e.g., a rectangular-shaped tube or plate). In one embodiment a decoupler member can have a hollow interior.

The decoupler members 117 can be formed from fabricated metal or other suitably rigid materials, and the laser superstructure 110 can be formed from fabricated laser-compatible materials, such as aluminum. In one embodiment, for example, the decoupler members 117 are formed from nickel/iron alloys (e.g., FeNi42 or FeNiCo alloys) having a coefficient of thermal expansion (CTE) that is relatively smaller than the CTE of the laser superstructure 110. For example, the decoupler members can be fabricated from Invar, Inovco, Elinvar, and/or Sitall, which have a substantially lower CTE than the CTE of aluminum. Accordingly, the volumetric thermal expansion of the decoupler members 117 can be substantially less than the volumetric thermal expansion of the laser superstructure 110. As further shown in FIGS. 1A and 1B, a thermal insulator 116 (e.g., a ceramic spacer) can be disposed between the decoupler members 117 and sidewall surfaces 112 of the laser superstructure 110. The thermal insulator 116 can thermally isolate the decoupler members 117 from the laser superstructure 110. In additional or alternate embodiments, the decoupler members 117 can be thermally isolated from the sidewall surfaces 112 by forming a gap (not shown) between the decoupler members 117 and the sidewall surfaces 112. As described in greater detail below, the relatively lower CTE and/or thermal isolation of the decoupler members 117 can thermally decouple the optical assemblies 140 from the resonator structure 110, which, in turn, increases beam path stability between the optical assemblies 140.

With reference still to FIG. 1B, the laser superstructure 110 is configured to slidably receive a removable electrode assembly 170 within the cavity 113 through an opening 114 at the first side 115a. The electrode assembly 170 includes a frame 172 (e.g., an electrode cage) carrying a first electrode 173a (or electrode array) and a second electrode 173b (or electrode array) facing the first electrode 173a (collectively "electrodes 173"). The electrodes 173 are operably coupled to an energy source 175 (shown schematically), such as an RF energy source, configured to energize the electrodes 173 and excite a plasma therebetween. The laser superstructure's opening 114 is sealed by the first optical assembly 140a and an extension member 126 (e.g., metal extension) located between the first optical assembly 140a and a flange 122 surrounding the perimeter of the opening 114. For example, either side of the extension member 126 can be welded, clamped, fastened, adhered, and/or otherwise coupled to the flange 122 and first optical assembly 140a to form a tight seal for holding a low pressure or vacuum in the cavity 113.

Figure 1C:
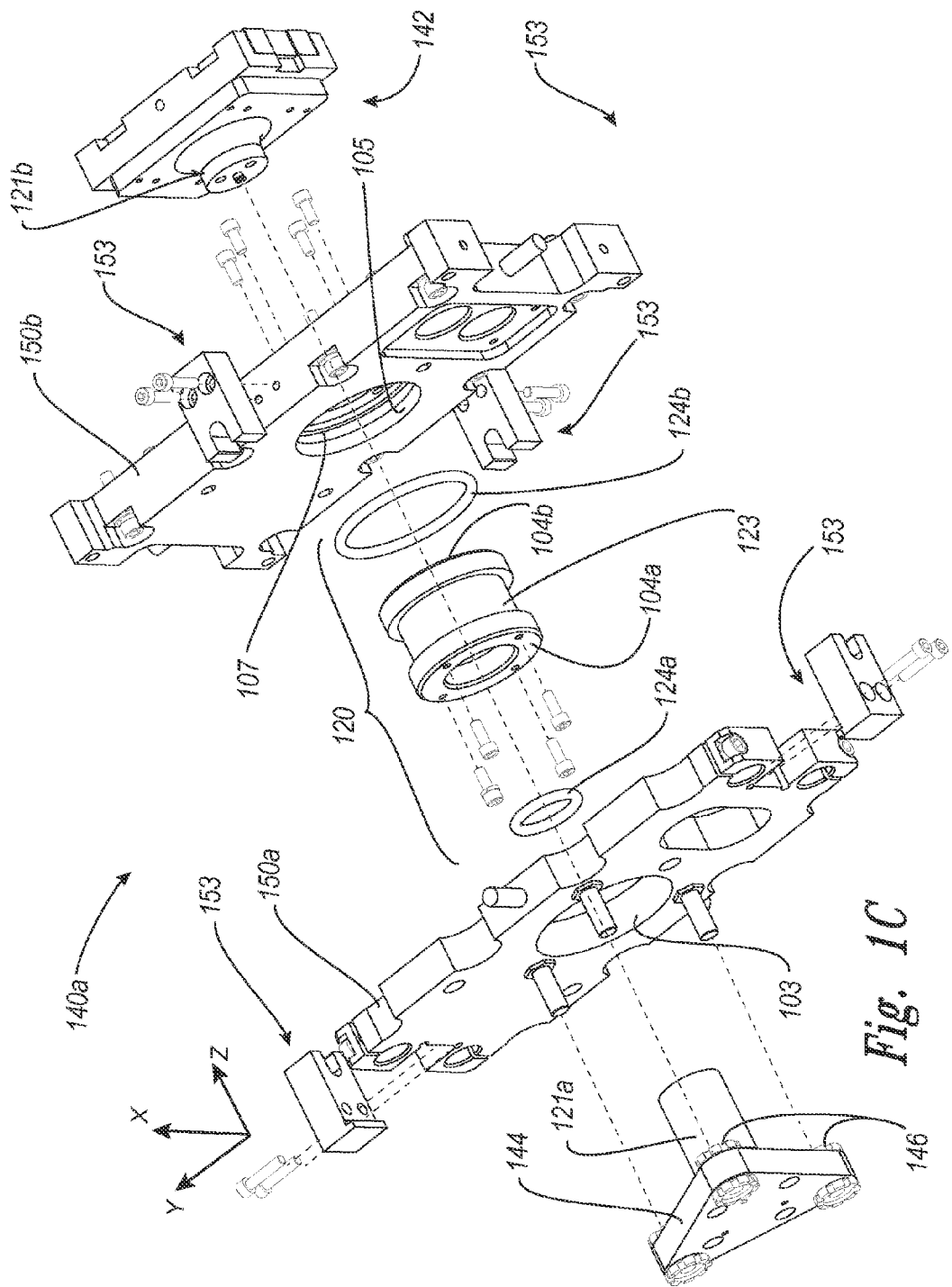
FIG. 1C is a partially-exploded isometric view showing an optical assembly of the laser of FIGS. 1A and 1C in more detail.

FIG. 1C is a partially-exploded isometric view showing the first optical assembly 140a in more detail. As shown, the first optical assembly 140a includes first and second holder members or first and seconds plates 150a and 150b, respectively, and a resonator optics assembly 142 ("resonator optics 142"). As shown, the second plate 150b is disposed between resonator optics 142 and the first plate 150a and pivotally coupled to the first plate 150a via a plurality of rotational joints 153. As described in greater detail below, the rotational joints 153 enable the second plate 150b to pivot relative to the first plate 150a for mechanically stabilizing the resonator optics 142 to maintain optical alignment when the laser superstructure 110 bends, twists, warps, or otherwise deforms due to thermal expansion.

In the illustrated embodiment, the first plate 150a includes a first aperture 103, the second plate 150b includes a second aperture 105, and the adjustment structure 144 includes a linkage having linkages elements 121a and 121b that extend through first and second apertures 103 and 105 to operably couple the adjustment structure 144 to the resonator optics 142. As further shown in FIG. 1C, a flexible seal assembly 120 ("flexible seal 120") extends through the first aperture 103 and is seated on an inner shelf 107 within the second aperture 105. In the illustrated embodiment, the flexible seal 120 includes a bellows 123 (e.g., stainless steel bellows) having an outer flange 104a and an inner flange 104b. The flexible seal 120 further includes a first seal member 124a (e.g., an O-ring) disposed between the adjustment structure 144 and the outer flange 104a, and a second seal member 124b (e.g., another O-ring) is disposed between the inner flange 104b and the inner shelf 107. As described in greater detail below with reference to FIGS. 2A and 2B, the flexible seal 120 is configured to maintain the low pressure seal of the cavity 113 by expanding and contracting to accommodate thermal expansion and contraction of the laser superstructure 100. In at least some embodiment, the flexible seal 120 can include other types of stretchable/compressible members in addition to or in lieu of a bellows, such as a stretchable/compressible gasket (e.g., a stretchable/compressible O-ring) or an accordion-pleated seal.

Figure 2:
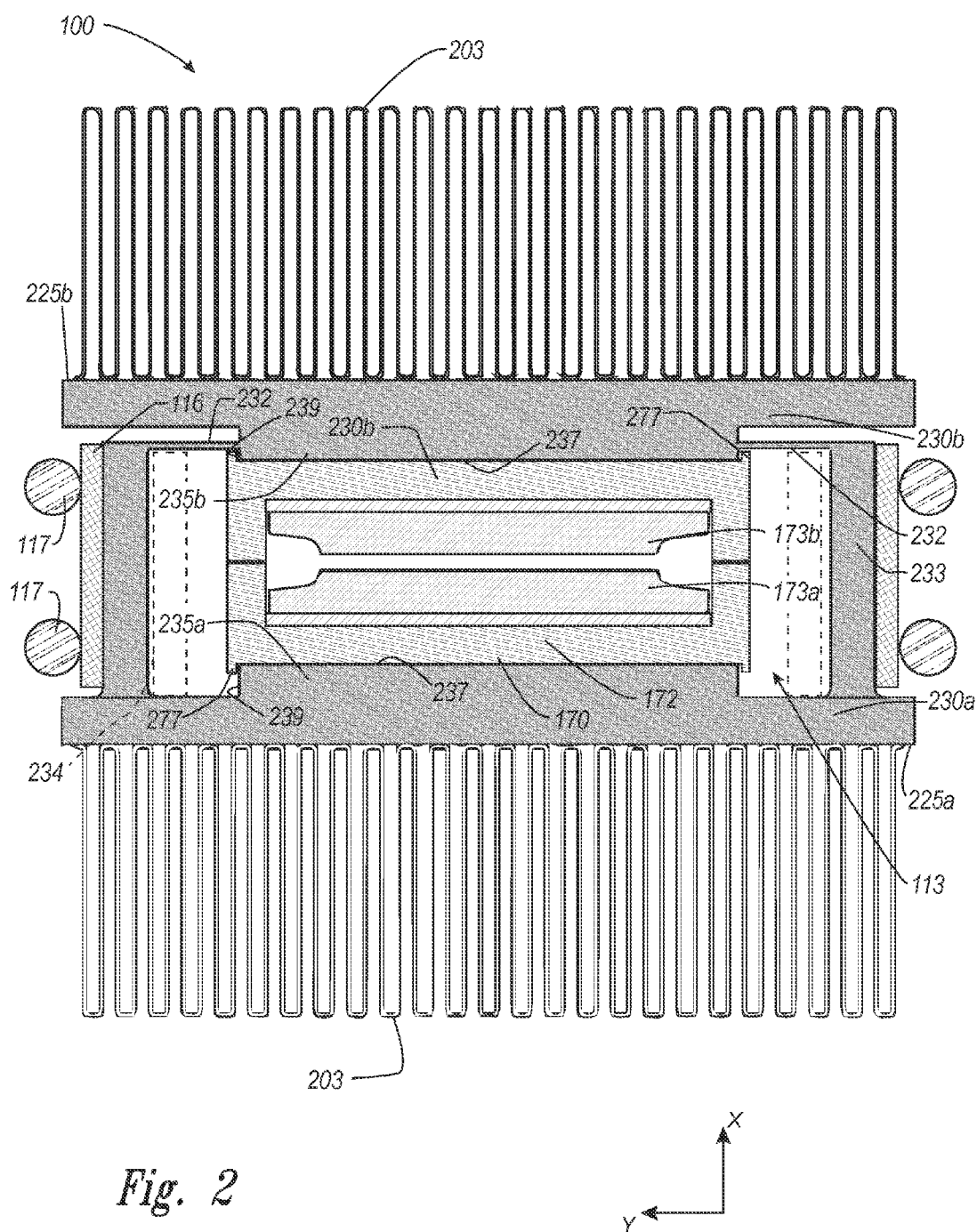
FIG. 2 is a cross-sectional view of the laser of FIGS. 1A and 1B.

FIG. 2 is a cross-sectional view of the laser 100 taken along line 2-2 of FIG. 1A. As shown, the laser 100 includes a plurality of heat distributors 203 attached to lower and upper outer surface surfaces 225a and 225b of the laser superstructure 110 and extending along its long axis. The heat distributors 203 project outwardly from surfaces 225a and 225b and collectively form a large surface area through which the laser superstructure 110 can transfer heat into the ambient environment. In one embodiment, the laser 100 can include an air mover (not shown), such as a fan, configured to move air axially through the heat distributors 203 and to increase the rate of heat transfer through the walls of the laser superstructure 100. The heat distributors 203 can have a geometry and/or density optimized to a performance curve associated with the air mover. In one embodiment, the heat distributors 203 can be formed from folded or corrugated sheet metal, and the heat distributors 203 can be welded, bonded, or otherwise coupled to the lower and uppers surfaces 225a and 225b. In other embodiments, however, the heat distributors 203 may be composed of different materials and/or have a different arrangement.

As further shown in FIG. 2, the laser superstructure 110 includes a generally planar lower member 230a and a U-shaped upper member 230b. The lower member 230a is joined to outer sidewall portions 233 of the upper member 230b, and the lower member 230a includes a raised first base portion 235a facing a corresponding second base portion 235b of the upper member 230b (collectively "base portions 235"). Each of the base portions 235 has an inner surface 237 that contacts the electrode assembly's frame 172 and side surfaces 239 that cooperate with ridges 277 projecting outwardly from the frame 172.

The upper member 230b includes flexible wall portions 232 extending laterally from the second base portion 235b and toward the outer sidewalls 233. In use, the flexible walls 232 enable the laser superstructure 110 to expand when the electrode assembly 170 is pushed into the cavity 113 through the opening 114 (FIG. 1B). The flexible walls 232 can collapse the laser superstructure 110 onto the electrode assembly 170 when it is fully installed in the cavity 113 and properly seated on the base portions 235. In one embodiment, the laser superstructure 110 can have a configuration that enables it to expand and collapse in a manner similar to that described in U.S. Pat. No. 6,983,001, filed Dec. 16, 2002, and titled "Laser with Heat Transfer System," which is incorporated herein by reference in its entirety.

In the illustrated embodiment, the lower and upper members 230a and 230b are fabricated separately (e.g., via metal extrusion) and then joined together to form a continuous structure. For example, the outer sidewalls 233 can be joined to a surface of the lower member 230a, using, e.g., brazing, welding, or suitable other attachment techniques. In an alternate embodiment, the lower member 230a can include sidewall portions 234 (shown in hidden lines) extending toward the upper member 230b and located between the outer sidewalls 233.

One advantage of forming the lower and upper members 230a and 230b separately is that it enables the various features (e.g., the base portions 235, the flexible walls 232, etc.) to be defined in the members 230a and 230b using high-precision fabrication processes, such as milling, laser cutting, or mechanical polishing. For example, in one embodiment, the laser superstructure's inner surfaces 237 can be polished to reduce surface topography. In one aspect of this embodiment, the polished surfaces can increase thermal transfer between the laser superstructure 110 and the electrode assembly 170. In an additional or alternate embodiment, the base portions 235, the flexible walls 232, and other features of the laser superstructure 110 can be milled, laser-cut, or otherwise defined in either of the inner surfaces 237 and/or other surfaces of the laser superstructure 110. In at least some embodiments, these features can be formed with tight dimensional tolerances to improve heat distribution and thermal uniformity (i.e., thermal symmetry).

Thermal Decoupling

Figure 3A:
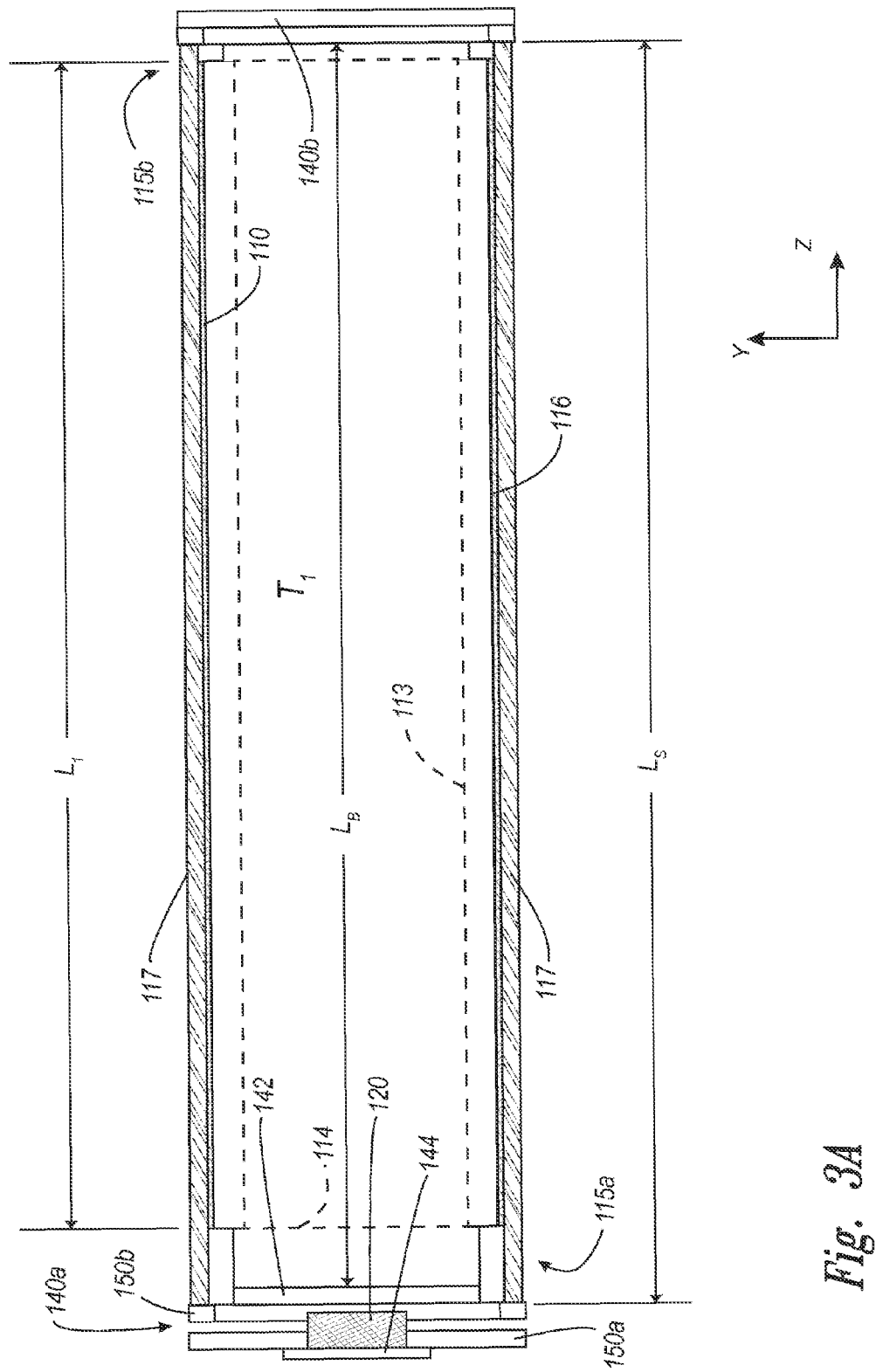
FIG. 3A is a top plan view of a laser superstructure of the laser of FIGS. 1A and 1B in a contracted state in accordance with an embodiment of the present technology.

As noted above, the decoupler members 117 can thermally decouple the optical assemblies 140 from the laser superstructure 110 to prevent thermal expansion and contraction of the laser superstructure 110 from affecting the resonator mirror spacing. FIG. 3A is a top plan view of the laser superstructure 110 in a contracted state (e.g., a non-expanded state or a less expanded state) in accordance with an embodiment of the present technology. As shown, the laser superstructure 110 is at a first temperature level, $T_1$, and the laser superstructure 110 has a first length $L_1$ along the long axis, the decoupler members 117 each have a length $L_S$, and the resonator optical assemblies 140 define a resonator optics spacing of length $L_B$. In one embodiment, the laser superstructure 110 is at the first temperature level $T_1$ when the laser 100 is an off state. For example, in one embodiment the first temperature level $T_1$ can be a room temperature level. Alternately, the laser superstructure 110 can be at the first temperature level $T_1$ when the laser 100 is in a cool down phase or when it is operating at low power.

Figure 3B:
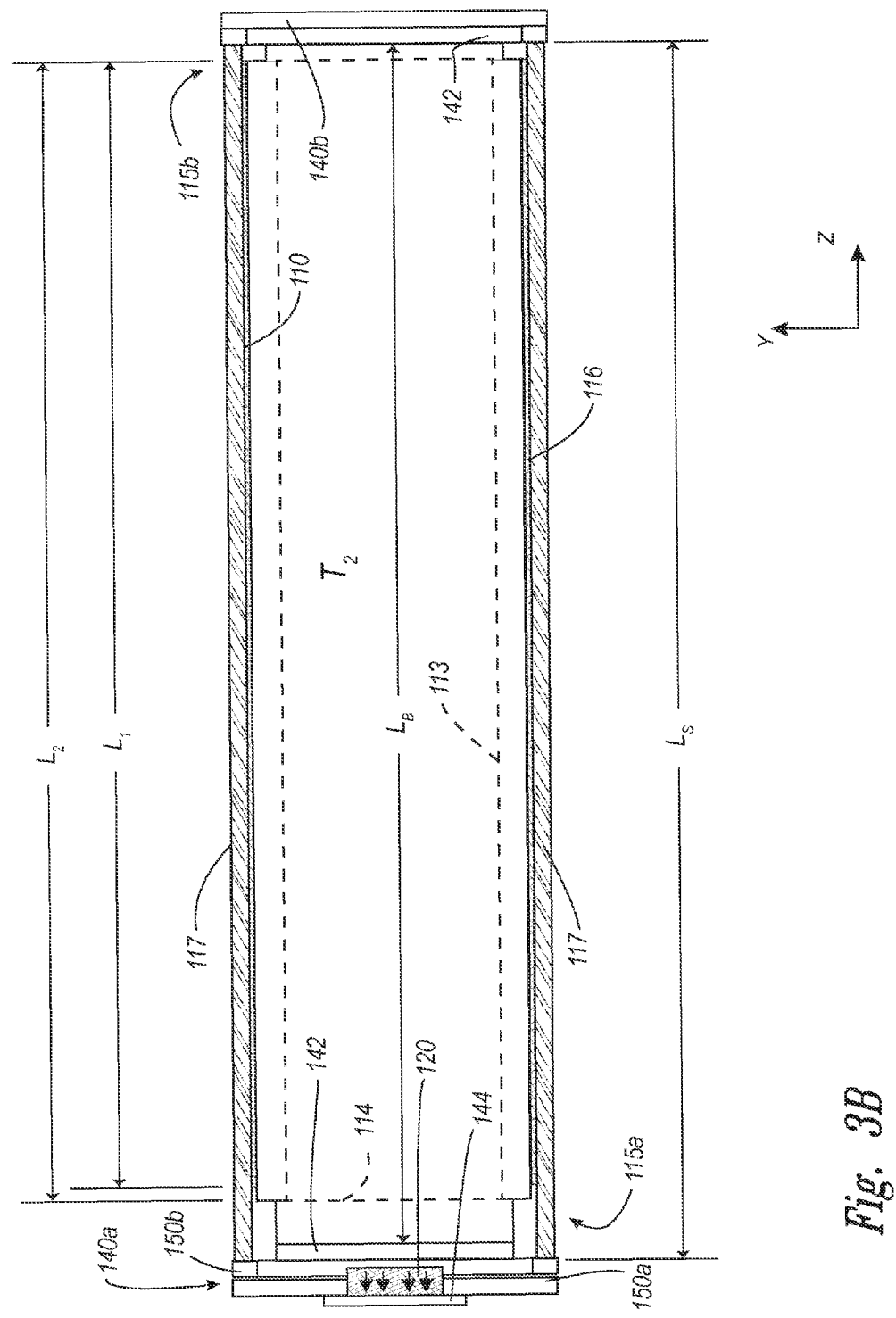
FIG. 3B is a top plan view of the laser superstructure in an expanded state in accordance with an embodiment of the present technology.

FIG. 3B is a top plan view of the laser superstructure 110 in an expanded state in accordance with an embodiment of the present technology. As shown, the laser superstructure 110 has been heated from the first temperature level $T_1$ to a second temperature level, $T_2$. The laser superstructure 110 can be at the second temperature level $T_2$, for example, when the laser 100 is operating at high power and transferring a substantial amount of heat into the body of the laser superstructure 110. In the illustrated embodiment, the increased heat has caused the laser superstructure 110 to expand from the first length $L_1$ to a second length $L_2$. The decoupler members 117, however, have not substantially expanded. As discussed above, the decoupler members 117 can have a low CTE and/or they can be thermally isolated from the laser superstructure 110. As a result, the decoupler member length $L_S$ generally does not change when the laser superstructure 110 is heated to the elevated temperature $T_2$ thereby stabilizing the resonator optics spacing $L_R$. Likewise, the length of the beam path $L_B$ does not change since the resonator optical assemblies 140 are fixedly coupled to the decoupler members 117. As further shown in FIG. 3B, the laser superstructure 110 has forced the flexible seal 120 towards the first plate 150a, and the flexible seal 120 has been compressed between the first and second plates 150a and 150b (as shown by the arrows). Because the flexible seal 120 is compressible, the expansion of the laser superstructure 110 does not rupture the seal 120 and the cavity 113 maintains its seal integrity.

Optical Assembly

As discussed above, the first optical assembly 140a can have the ability compensate for any bending of the laser superstructure 110 caused by thermal expansion. In some instances, the bending of the laser superstructure 110 can force (e.g., push/pull) the decoupler members 117 in the Z-axis directions, which in turn produces forces that cause movement or shifting of the first optical assembly 140a relative to the laser superstructure 110. If uncorrected, such movement or shifting might ultimately affect the alignment of the optical assemblies 140 and/or the beam path therebetween. As described below, the first optical assembly 140a is configured to decouple the resonator optics 142 (FIG. 1C) from the laser superstructure 110 in a way that prevents bending, twisting, warping or other types of laser superstructure deformation from causing misalignment between the optical assemblies 140.

Figure 4:
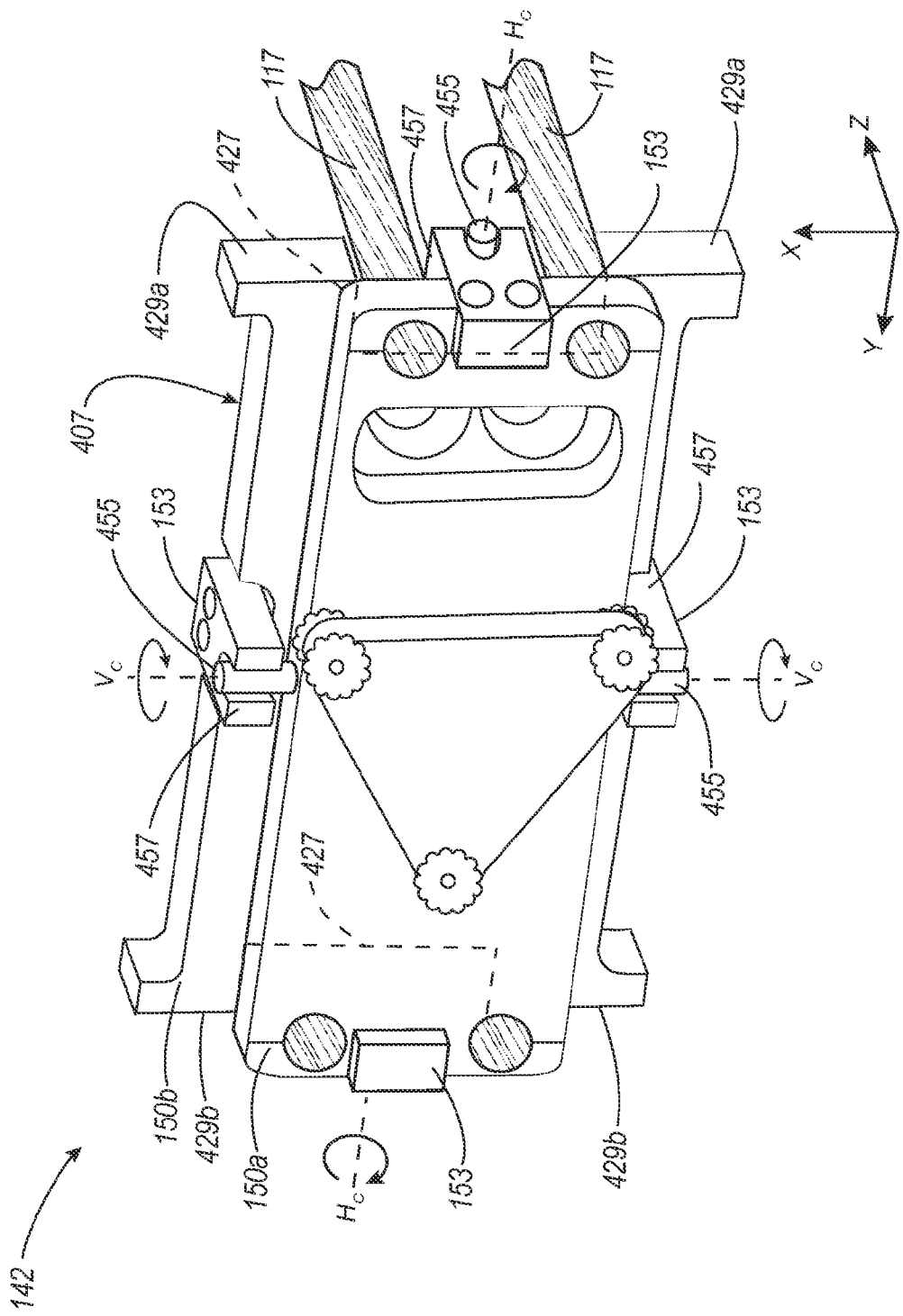
FIG. 4 is a partially exploded view showing a portion of the optical assembly in more detail.

FIG. 4 is an enlarged isometric view showing the first plate 150a and the second plate 150b of the first optical assembly 140a in more detail. As shown, the first plate 150a is fixedly coupled to the decoupler members 117 and pivotally coupled to the second 150b by the rotational joints 153, which are located at the top, bottom, left, and right sides of each of the plates. Each of the rotational joints 153 includes a pivot element or pivot pin 455 slidably received in a corresponding receptacle 457. The pivot pins 455 on the first plate 150a are aligned to the horizontal center line Hc, and the pivot pins 455 on the second plate 150b are aligned to the vertical center line Vc.

The second plate 150b is fixedly coupled to the flexible seal 120 (FIG. 1B) and carries a portion of the laser's resonator optics (not visible in FIG. 4) at rearward facing side 407. The second plate 150b includes left and right edge portions 429a and 429b. The left and right edge portions 429a and 429b have cut-out regions 427 (shown in hidden lines) through which each pair of decoupler members 117 extend to engage the first plate 150a without contacting the second plate 150b and the corresponding rotational joint 153 located therebetween.

In operation, the second plate 150b holds a steady beam path by maintaining alignment of the laser's resonator optics across the cavity 113 (FIG. 1B), and the second plate 150b pivots relative to the first plate 150a to isolate resonator optics 142 (FIG. 1C) from the effects of asymmetric thermal expansion of the laser superstructure 110. More specifically, the second plate 150b rotates about the X- and/or Y-axis in response to Z-axis movement of laser superstructure 110. For example, when the left and right sides of the laser superstructure 110 force the second plate 150b in opposite Z-axis directions, the top and bottom rotational joints 153 enable the second plate 150b to pivot about the vertical center line Vc in the clockwise or counterclockwise direction. When the upper and lower sides of laser superstructure 110 force the second plate 150b in opposite Z-axis directions, the left and right rotational joints 153 enable the second plate 150b to pivot about the horizontal center line Hc in the clockwise or counterclockwise direction. In one aspect of this embodiment, the rotational joints 153 generally provide only two degrees of freedom (i.e., about the vertical and horizontal center lines), and therefore the first and second plates 150a and 150b are not free to translate in the X-Y plane nor are they free to rotate about the Z-axis.

Electrode Assembly

Figure 5:
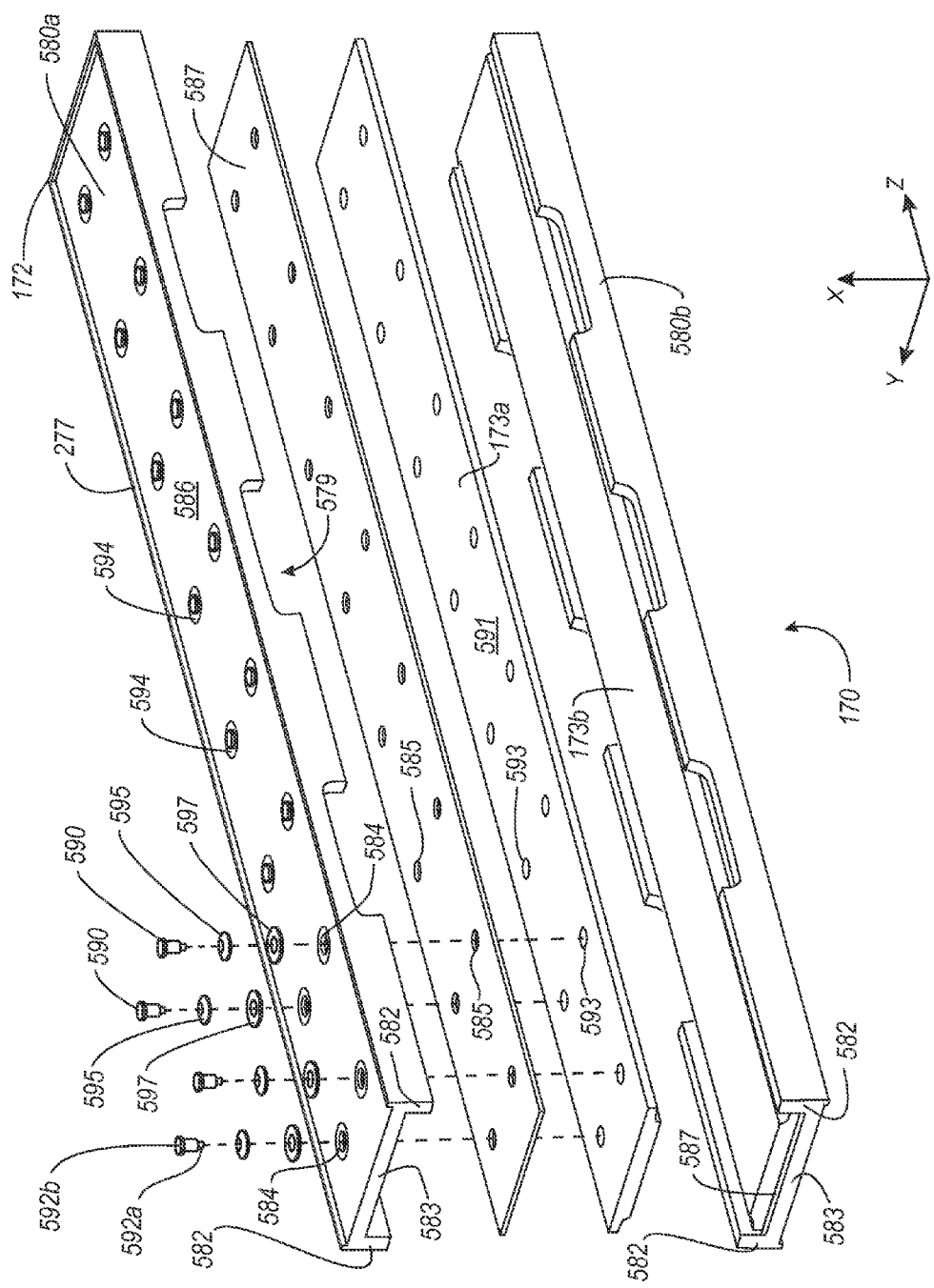
FIG. 5 is a partially exploded view showing an electrode assembly of the laser in more detail.

In at least some embodiments, the electrode assembly 170 can be configured to improve heat transfer through the laser superstructure 110 and into the ambient. FIG. 5 is a partially exploded view showing the electrode assembly 170 in more detail. The frame 172, for example, includes a first frame member 580a and a second frame member 580b (collectively "frame members 580") seated on outer wall portions 582 of the first frame member 580a. Individual frame members 580 include a central wall portion 583 having an outer surface 586 configured to engage either of the laser superstructure's inner surfaces 237 (FIG. 2). The central wall portion 583 is integrally formed with the outer wall portions 582, and the wall portions 582 and 583 together define an interior cavity 579 containing one of the electrodes 173. Each of the electrodes 173 is electrically isolated from the frame 172 by a dielectric spacer 587 located between the frame 172 and either of the electrodes 173. The dielectric spacer 587 can include, for example, an aluminum oxide plate.

As further shown in FIG. 5, a plurality of arrayed first openings 584 extend through the central wall portion 583 of the first frame member 580a, a plurality of arrayed second openings 585 extend through the underlying dielectric spacer 587, and a plurality of threaded holes 593 extend into a backside surface 591 of the first electrode 173a. Each of the threaded holes 593 is configured to receive a first end portion 592a of a fastener 590 (e.g., a shoulder screw) inserted through one of the first openings 584 and a corresponding one of the second openings 585. Each of the first openings 584 is surrounded by an individual depression 594, and the depression 594 is positioned to receive a dielectric element 595 and a biasing element 597 held in place by a second end portion 592b of the fastener 590. In one embodiment, the dielectric element 595 is a ceramic washer and the biasing element 597 is a belleville washer. In other embodiments, however, other types of insulator and/or biasing elements can be used. In an additional or alternate embodiment, the fastener 590 can have an electrically insulative coating.

In use, each fastener 590 and corresponding biasing element 597 firmly holds a portion of the frame member 580a, the underlying dielectric spacer 587, and the underlying electrode 173 in surface-to-surface contact. More specifically, the spring force of the biasing element 597 biases the fastener's second end portion 592b away from the first frame member 580a. When forced away from the first frame member 580a, the fastener 590 pulls the underlying electrode 173a into full contact with the spacer 587 and the spacer 587 into full contact with the interior side of the corresponding central wall portion 583 of the frame member 580.

In one aspect of this embodiment, the fastener 590 and the biasing element 597 help reduce thermal resistance through the electrode assembly 170 by closing localized gaps between the electrode 173a and the spacer 587 and between the spacer 587 and the first frame member 580a. In some instances, a gap may form during thermal expansion because of asymmetries in the geometry and/or the materials of the frame member 580a, the spacer 587, and/or the electrode 173a. In at least some embodiments, the spring force of the biasing element 597 can be selected to suitably close the gap, yet prevent spring forces from accumulating within the electrode 173a and the spacer 587 during thermal expansion. Although not shown in FIG. 5 for purposes of clarity, similar fasteners and biasing elements can be used to hold the second frame member 580b, the corresponding spacer 587, and the second electrode 173b in surface-to-surface contact with one another.

Resonator Optics Assembly

Figure 6A:
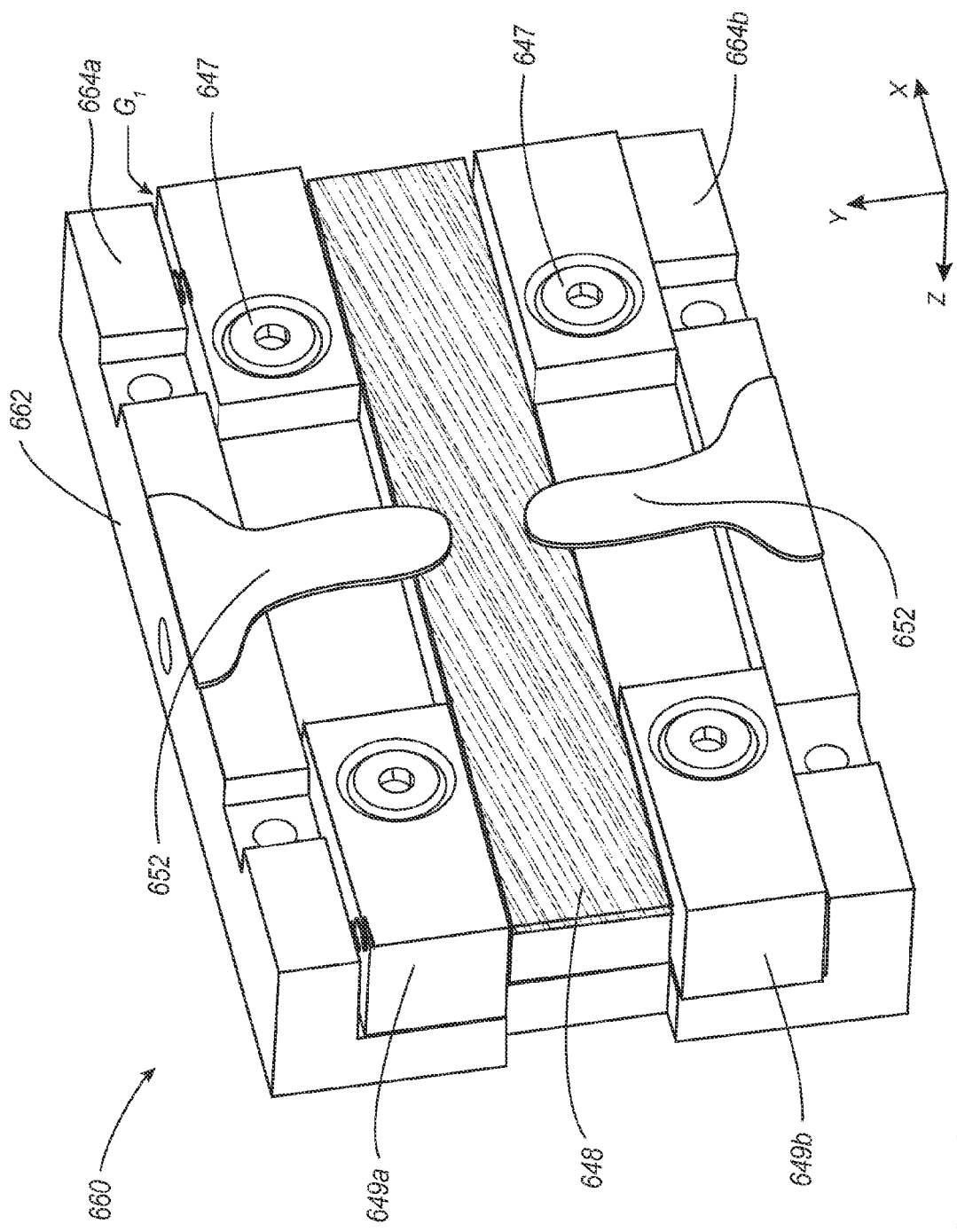
FIG. 6A is an isometric view and FIG. 6B is a partially-exploded isometric view showing a resonator optics assembly of the laser in more detail.
Figure 6B:
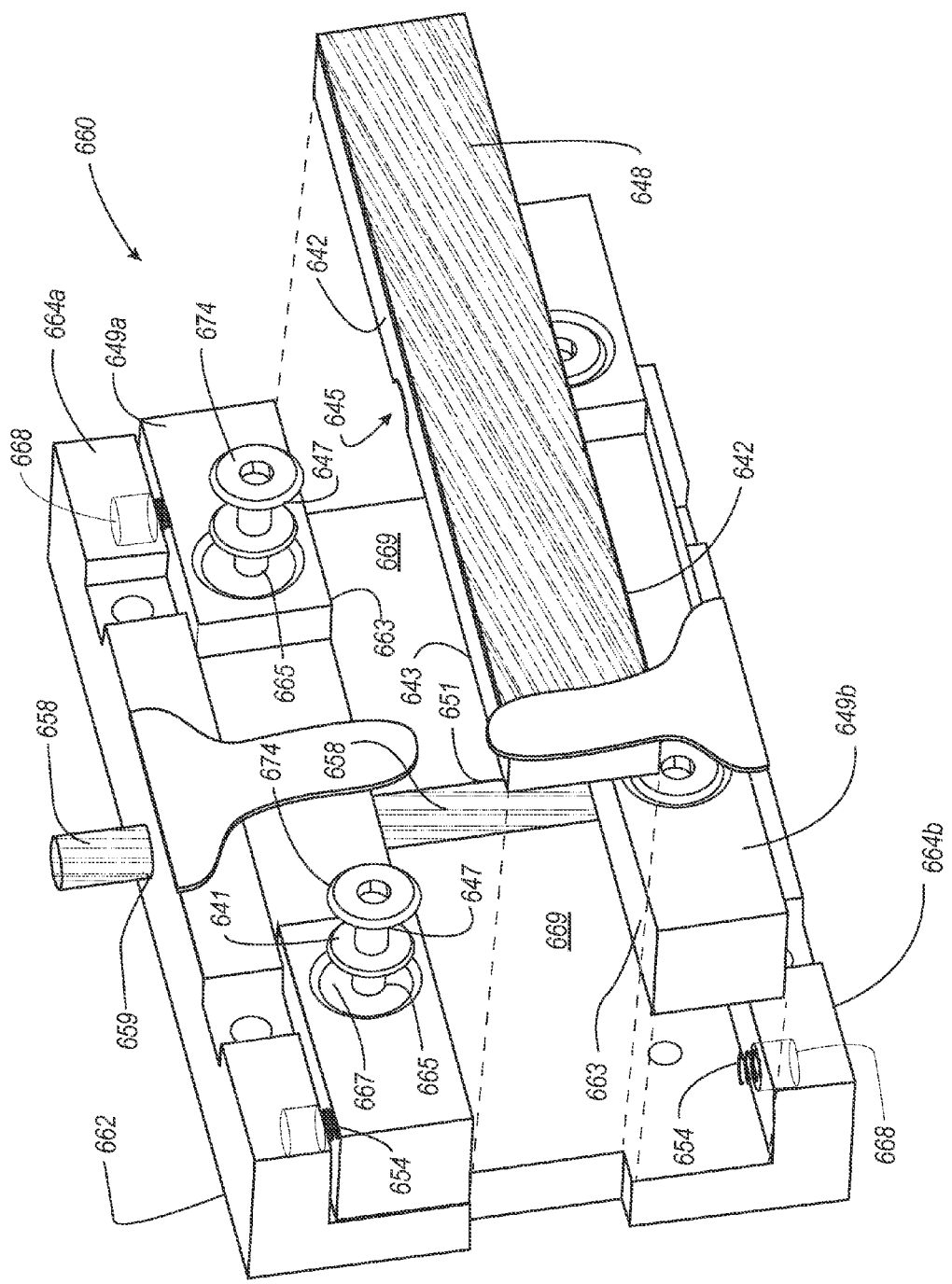

The laser 100 can also be configured to reduce the effects of thermal expansion at the optical assemblies 140 by sinking localized heat absorbed into the optics (e.g., heat associated with non-reflected beam energy). FIG. 6A is an isometric view and FIG. 6B is a partially-exploded isometric view showing the resonator optics 142 in more detail. The resonator optics 142 are configured to carry and position the optical element 648 (e.g., a mirror) within the laser cavity 113. As described below, the resonator optics 142 are also configured to sink heat from the optical element 648 during operation of the laser 100.

As shown in FIG. 6A, the resonator optics includes a carrier member 662 ("carrier 662") having a raised upper portion 664a and a raised lower portion 664b (collectively "raised portions 664"). A first heat sink element 649a is adjacent the upper portion 664a, a second heat sink element 649b is adjacent the lower portion 664b, and the optical element 648 is sandwiched between the first and second heat sink elements 649a and 649b ("collectively heat sink elements 649") and held against the carrier 662 by first biasing elements 652 (e.g., spring fingers) extending downwardly from either of the raised portions 664.

Referring to FIG. 6B, each of the raised portions 664 includes an aperture 668 facing an adjacent heat sink element 649 and containing a second biasing element 654 (e.g., a compression spring). The second biasing element 654 extends outside of the aperture 668 and is positioned to engage an outer side surface 661 of an adjacent heat sink element 649. Each of the heat sink elements 649 has an inner side surface 663 that engages a corresponding side surface 642 of the optical element 648. The heat sink elements 649 include openings 665 configured to receive fasteners 647, and the fasteners 647 extend through the openings 665 to couple the heat sink elements 649 to the carrier 662. The openings 665 are surrounded by a surface depression 667 configured to receive a third biasing element 641 (e.g., a belleville washer), and the third biasing element 641 is held within the depression 667 by an end portion 674 of the fastener 647. The optical element 648 has a backside surface 643 and a surface feature 645 formed therein and biased into engagement with a retainment element 658 (e.g., a rod or pin) via the first biasing elements 652 (FIG. 6A). The retainment element 658 is located in a channel 651 extending vertically through a forward facing surface 669 of the carrier 662. The retainment element 658 is configured to be inserted into the channel 651 through a hole 659 in the upper portion 664a of the carrier 662.

In operation, the carrier member transfers heat away from the optical element 648 through its backside surface 643 and its sides surfaces 642. The first biasing elements 652 enhance heat transfer through the backside surface 643 by urging the optical element 648 against the carrier's forward facing surface 669 and by maintaining surface-to-surface contact therebetween. The first biasing elements 652 also hold the surface feature 645 and the retainment element 658 in engagement with one another. In one aspect of this embodiment, the retainment element 658 keeps the optical element 648 from moving in the lateral direction along its long axis. For example, the retainment element 658 can prevent the optical element 648 from shifting during thermal expansion and/or when transporting the laser 100.

The heat sink elements 649 facilitate heat transfer through the side surfaces 642 of the optical element 648. The second biasing elements 654 further enhance heat transfer at the side surfaces 642 by urging the heat sink elements 649 against the optical element 648 and by maintaining surface-to-surface contact therebetween. Referring to FIG. 6A, the second biasing elements 654 also maintain a gap $G_1$ between the heat sink elements 649 and either of the outer portions 664. The gap $G_1$ provides a space into which the heat sink elements 649 can thermally expand. In one aspect of this embodiment, the gap $G_1$ can prevent stress concentrations from forming within the heat sink elements 649 and/or the optical element 648 during thermal expansion. Similar to the second biasing elements 654, the third biasing elements 641 can have a spring force selected to bias the heat sink elements 649 against the carrier 662 yet still allow the heat sink elements 649 to expand outwardly.

From the foregoing, it will be appreciated that specific embodiments of the disclosure have been described herein for purposes of illustration, but that various modifications may be made without deviating from the spirit and scope of the various embodiments of the present technology. Moreover, because many of the basic structures and functions of laser apparatus are known, they have not been shown or described in further detail to avoid unnecessarily obscuring the described embodiments. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure.

We claim:

1. A laser, comprising:
 a laser superstructure having a first side and a second side opposite the first side;
 an elongated thermal decoupler member having a first end portion and a second end portion, wherein the second end portion is fixedly coupled to the laser superstructure; and
 an optical assembly, including
  a first holder member fixedly coupled to the first end portion of the thermal decoupler,
  a second holder member fixedly coupled to the laser superstructure proximate the first side,
  first and second rotational joints pivotally coupling the second holder to the first holder member, wherein the first and second rotational joints define a pivot axis about which the second holder member can pivot, and
  a flexible seal, wherein a portion of the flexible seal is coupled to the laser structure proximate the first side and disposed at least between the first holder member and the second holder member.

2. The laser of claim 1 wherein the optical assembly includes an aperture extending at least partially therethrough, wherein the flexible seal is positioned within the aperture.

3. The laser of claim 1 wherein the flexible seal includes a bellows.

4. The laser of claim 1 wherein the second end portion of the thermal decoupler member is fixedly coupled to the laser superstructure proximate the second side.

5. The laser of claim 1 wherein the optical assembly is a first optical assembly, and wherein the laser includes a second optical assembly fixedly coupled to the laser superstructure proximate the second side, and wherein the second end portion of the thermal decoupler member is fixedly coupled to the second optical assembly.

6. The laser of claim 1 wherein the thermal decoupler member is a first thermal decoupler member, wherein the laser superstructure includes a second thermal decoupler member, and wherein the first and second thermal decoupler members extend along opposite sides of the laser superstructure.

7. The laser of claim 1 wherein the thermal decoupler member includes an elongated rod.

8. The laser of claim 1 wherein the laser superstructure includes a material having a first coefficient of thermal expansion (CTE), and wherein the thermal decoupler member includes a material have a second CTE that is less than the first CTE.

9. The laser of claim 1 wherein the laser superstructure has a first side, a second side, and a sidewall extending therebetween, wherein the thermal decoupler member is spaced apart from the sidewall, and wherein the laser further comprises a thermal insulator between the sidewall and the thermal decoupler member.

10. A laser, comprising:
a laser superstructure having a first side and a second side opposite the first side;
an elongated thermal decoupler member having a first end portion and a second end portion, wherein the second end portion is fixedly coupled to the laser superstructure; and
an optical assembly, including
a first holder member fixedly coupled to the first end portion of the thermal decoupler, wherein the first holder member has a first side and a second side opposite the first side;
a second holder member pivotally coupled to the first holder member, and fixedly coupled to the laser superstructure proximate the first side, and
a flexible seal, wherein a portion of the flexible seal is coupled to the laser structure proximate the first side and disposed at least between the first holder member and the second holder member,
wherein the optical assembly further includes
a first rotational joint proximate the first side; and
a second rotational joint proximate side, and
wherein the first and second rotational joint define an axis about which the second holder member can pivot.

11. The laser of claim 10 wherein each of the first and second rotational joints includes:
a pivot element coupled to the first holder member; and
a receptacle coupled to the second holder member and rotatably coupled to the pivot element.

12. The laser of claim 10 wherein the optical assembly includes:
a left side, a right side, a top side, and a bottom side; and
a plurality of rotational joints, wherein the plurality of rotational joints includes a first rotational joint proximate the left side, a second rotational joint proximate the right side, a third rotational joint proximate the top side, and a fourth rotational joint proximate the bottom side, wherein the first and second rotational joints define a first axis about which the second holder member can pivot, and wherein the third and fourth rotational joints define a second axis about which the second holder member can pivot.

13. The laser of claim 1 wherein the second end portion of the thermal decoupler member is fixedly coupled to the laser superstructure proximate the second side.

14. A laser, comprising:
a laser superstructure;
a thermal decoupler fixedly coupled to the laser superstructure; and
an optical assembly, including
a first holder member fixedly coupled to the thermal decoupler,
a second holder member fixedly coupled to the laser superstructure and sealably coupled to the first holder member, and
first and second rotational joints pivotally coupling the second holder member to the first holder member, wherein the first and second rotational joints define a pivot axis about which the second holder member pivots.

15. The laser of claim 14 wherein the optical assembly further includes a flexible seal disposed between the first holder member and the second holder member.

16. The laser of claim 14 wherein the thermal decoupler includes one or more elongated rods fixedly coupled to the laser superstructure.

17. The laser of claim 14 wherein each of the first and second rotational joints includes a pivot pin aligned with the pivot axis.

18. The laser of claim 17 wherein each of the first and second rotational joints further includes a receptacle fixedly attached to either the first holder member or the second holder member.

19. The laser of claim 14 wherein the pivot axis is a first pivot axis, and wherein the optical assembly further includes third and fourth rotational joints defining a second pivot axis about which the second holder member pivots.

20. The laser of claim 19 wherein the first pivot axis is perpendicular to the second pivot axis.

* * * * *